(Model.)
C. F. RIGBY.
FRUIT, VEGETABLE, AND BREAD CUTTER.
No. 372,173. Patented Oct. 25, 1887.
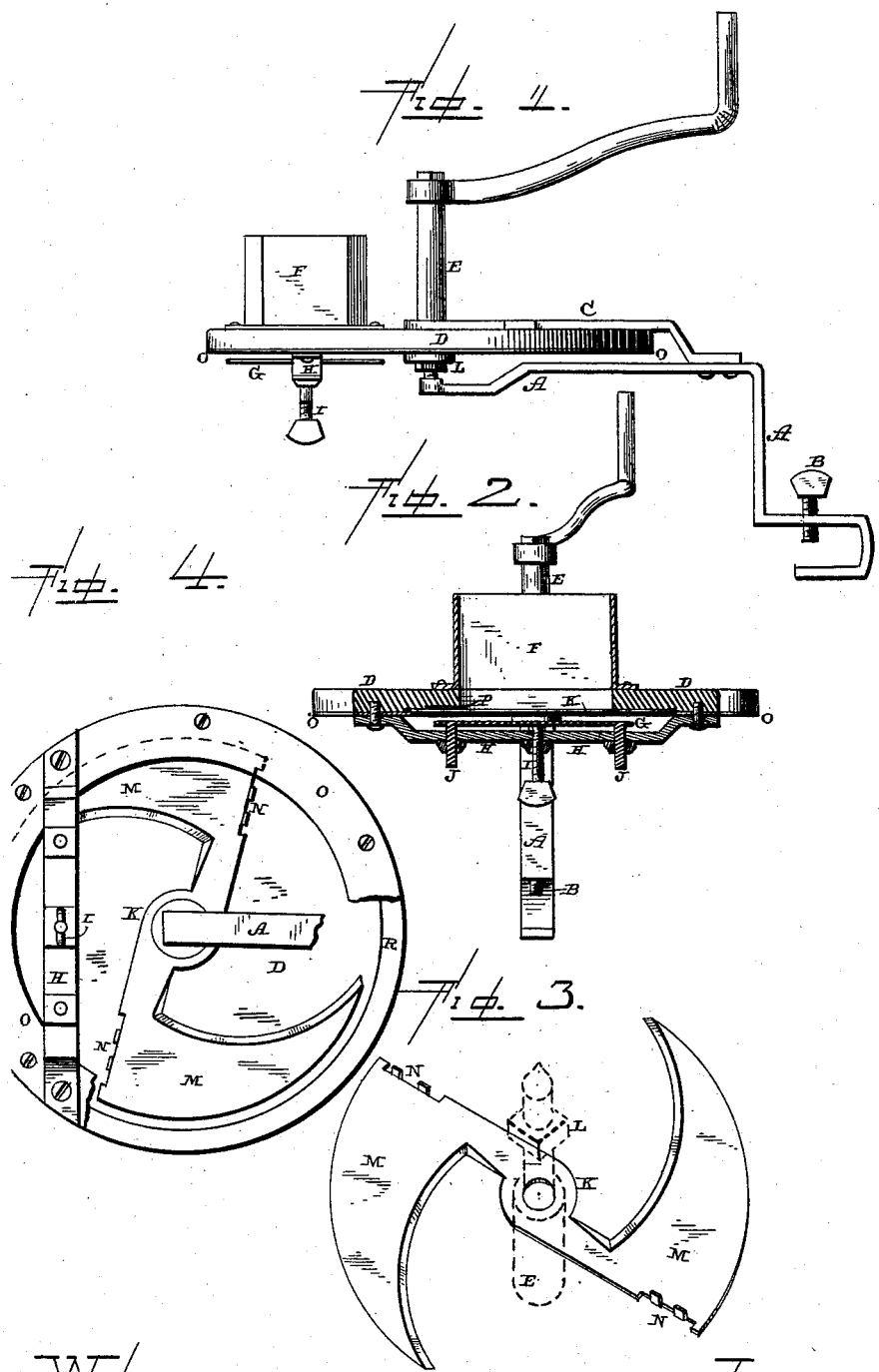

UNITED STATES PATENT OFFICE.

CLARK FREE RIGBY, OF FOXBURG, PENNSYLVANIA.

FRUIT, VEGETABLE, AND BREAD CUTTER.

SPECIFICATION forming part of Letters Patent No. 372,173, dated October 25, 1887.

Application filed July 11, 1887. Serial No. 244,009. (Model.)

*To all whom it may concern:*

Be it known that I, CLARK FREE RIGBY, of Foxburg, in the county of Clarion and State of Pennsylvania, have invented certain new and useful Improvements in Fruit, Vegetable, and Bread Slicers; and I do hereby declare the following to be a full, clear, and exact description of the invention, such as will enable others skilled in the art to which it pertains to make and use it, reference being had to the accompanying drawings, which form part of this specification.

My invention relates to an improvement in fruit, vegetable, and bread slicers; and it consists in, first, the combination of a circular disk having an opening, a hopper, an adjustable plate under the hopper, a two-edged revolving knife having stops upon their back edges, an operating-shaft to which the knife is fastened, and a support for the base, said support forming a bearing for one end of the operating-shaft; second, in the arrangement and combination of devices, which will be more fully described hereinafter, and pointed out in the claims.

The object of my invention is to produce a machine for slicing fruit, bread, and vegetables of all kinds, in which a two-edged knife of the peculiar construction hereinafter described is used; to provide a simple means whereby the thickness of the slice may be varied at will, and to provide the knife or knives with a stop or projection upon their back edges, by means of which the slice is pushed along after it has been cut.

Figure 1 is a side elevation of a machine embodying my invention. Fig. 2 is a vertical section taken through the hopper. Fig. 3 is a detail perspective of the knife, looking at the under side thereof. Fig. 4 is an inverted plan view, the plate G being removed and the strip O partly broken away.

The machine is supported by means of the metallic arm A, which is screwed to the table or other object by means of the screw B, which passes through the outer end of the arm A against the object to which it is desired to attach the machine. The arm A has rigidly secured to it the brace C, which is bent slightly upward and runs over the disk D, to which it is fastened, parallel to the arm A, and extends a slight distance beyond the center of the disk D. Passing through the brace C and disk D is the operating-shaft E, which has its inner end to rest in a cavity formed in the end of the arm A, which extends to the center of the disk D.

Secured to the disk D is the hopper F, which is placed over an opening formed therein corresponding in size and shape to the hopper. Supported under the hopper is the adjustable plate G, by means of which the thickness of the slice being cut is regulated as desired. The plate G is supported by means of the cross-piece H and thumb-screw I, which passes through the piece H, and has its inner end to bear against the outer side of the plate. The cross-piece H extends across the disk immediately under the hopper and has its ends screwed to the edge of the disk. Projecting from the outer side of the adjustable plate G, at each end thereof, are the guides J, which pass through the supporting-piece H and serve to prevent the plate from tilting at either end. For the purpose of preventing more perfectly the tilting of the plate the cross-piece H is thickened at the point where the guides pass through it, as shown.

Secured to the inner end of the operating-shaft E is the circular knife K, by means of the nut L, the upper side of the knife resting against a shoulder formed near the end of the operating-shaft, and between which shoulder and the nut it is securely clamped. The knife is composed of the two blades M, which are circular upon their outer sides and having their cutting-edges shaped as shown and running to a point. Bent upward from the back or straight edge of the knife are one or more projections, N, which catch the slice which is being cut and carry it away, allowing it to drop after passing from between the hopper and the plate G. The disk D is slightly thickened at its under circumference, as shown at R, Fig. 4, and secured to this thickened portion, and extending entirely around the circumference thereof, is the narrow metallic strip O, which reaches over the circumferential edge of the blades M and forms a guide therefor. The blades running to a point, as shown, and being of considerable length, it is necessary, in order to insure an even movement thereof, to provide a guide. This metallic strip O prevents any vibration or lateral movement of the points of the blades and insures an even cut at all times.

Fastened to the under side of the disk D and at one end of the hopper, as shown, is the stationary knife P, with which the blades M come in contact as they sweep under the hopper, and which gives the blades a shear cut and facilitates to a very great degree the cutting of whatever is placed in the hopper.

Having thus described my invention, I claim—

1. A revolving knife for slicing-machines, having stops formed upon its back or non-cutting edge, for the purpose described, substantially as set forth.

2. The combination of the disk D, hopper F, the cross-piece H, having apertures for the guides J and the thumb-screw I, the plate G, having guides J, the thumb-screw I, revolving knife K, an operating-shaft, and the supporting-arms A C, substantially as specified.

3. The combination of the disk D, hopper F, plate G, cross-piece H, operating-shaft E, knife K, supporting-arms A C, and the circular metallic strip O, which forms a guide for the blades M, substantially as shown and described.

In testimony whereof I affix my signature in presence of two witnesses.

CLARK FREE RIGBY.

Witnesses:
JAMES W. TOY,
WALTER SOURLY.